US011982285B2

(12) United States Patent
Schmitt et al.

(10) Patent No.: US 11,982,285 B2
(45) Date of Patent: May 14, 2024

(54) COMPRESSOR

(71) Applicant: BMTS Technology GmbH & Co. KG, Stuttgart (DE)

(72) Inventors: Steffen Schmitt, Ditzingen (DE); Frieder Stetter, Stuttgart (DE); Oliver Kuhne, Stuttgart (DE); Rüdiger Kleinschmidt, Besigheim (DE); Gunter Winkler, Stuttgart (DE)

(73) Assignee: BMTS Technology GmbH &Co. KG, Stuttgart (DE)

( * ) Notice: Subject to any disclaimer, the term of this patent is extended or adjusted under 35 U.S.C. 154(b) by 0 days.

(21) Appl. No.: 17/795,251

(22) PCT Filed: Feb. 4, 2021

(86) PCT No.: PCT/EP2021/052615
§ 371 (c)(1),
(2) Date: Jul. 26, 2022

(87) PCT Pub. No.: WO2021/160502
PCT Pub. Date: Aug. 19, 2021

(65) Prior Publication Data
US 2023/0146415 A1    May 11, 2023

(30) Foreign Application Priority Data

Feb. 11, 2020    (EP) .................................. 20 156 734

(51) Int. Cl.
*F04D 17/10*    (2006.01)
*F04D 25/06*    (2006.01)
(Continued)

(52) U.S. Cl.
CPC ........... *F04D 29/057* (2013.01); *F04D 17/10* (2013.01); *F04D 25/0606* (2013.01);
(Continued)

(58) Field of Classification Search
CPC ............... F04D 29/057; F04D 29/5806; F16C 33/6692; F16C 33/6685
See application file for complete search history.

(56) References Cited

U.S. PATENT DOCUMENTS

| | | | | |
|---|---|---|---|---|
| 4,002,224 A | * | 1/1977 | Easter | ..................... F01D 25/20 |
| | | | | 60/39.08 |
| 4,704,075 A | * | 11/1987 | Johnston | ............... F01D 25/125 |
| | | | | 417/407 |

(Continued)

FOREIGN PATENT DOCUMENTS

| | | |
|---|---|---|
| DE | 102009051560 A1 | 5/2011 |
| EP | 2600015 A1 | 6/2013 |
| WO | 2020114804 A1 | 6/2020 |

OTHER PUBLICATIONS

International Search Report for corresponding patent application No. PCT/EP2021/052615, dated Apr. 1, 2021, 13 pages (not prior art).

(Continued)

*Primary Examiner* — Eldon T Brockman
(74) *Attorney, Agent, or Firm* — Lucian Wayne Beavers; Patterson Intellectual Property Law, PC

(57) ABSTRACT

The invention relates to a compressor (20) for generating a compressed air flow for a fuel cell (10), having a compressor element (21), in particular a compressor wheel, wherein the compressor element (21) is coupled in a to a drive shaft (23) for co-rotation, the drive shaft (23) being driven by a motor (22), in particular an electric motor, wherein at least one hydrodynamic or hydrostatic bearing (24, 25) is used to mount the shaft (23) in a rotatable manner, wherein the plain bearing (24, 25) is connected to a lubricant supply means (30), which is used to supply a lubricant for hydrodynamic or hydrostatic pressure generation to the plain bearing (24, 25), wherein the lubricant is water or a fluid mixture, (Continued)

Figure 1:
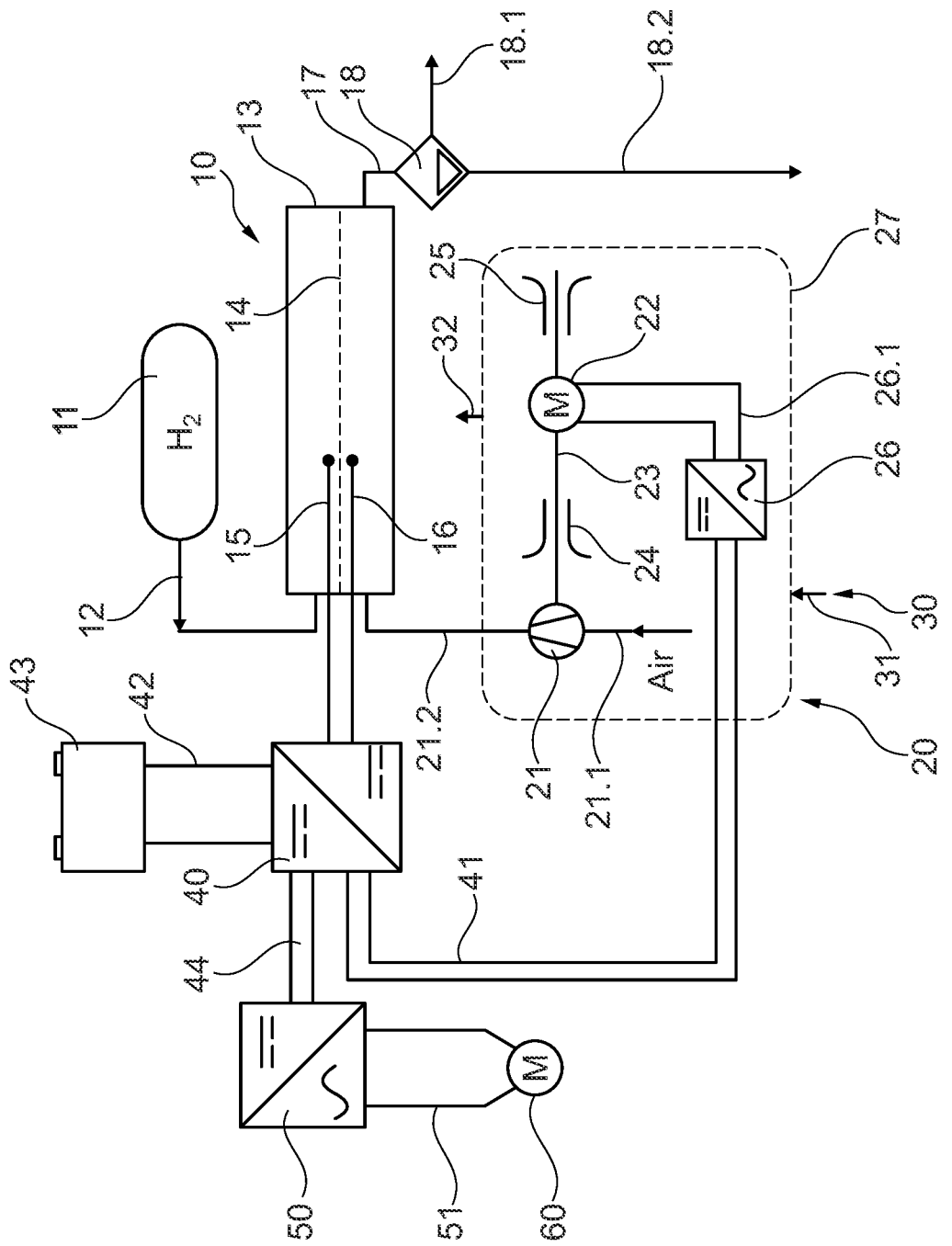

predominantly comprising water, wherein the plain bearing (24, 25) has a lubricant inlet and a lubricant outlet, wherein the lubricant can be routed to the plain bearing (24, 25) via the lubricant inlet and the lubricant can be discharged from the plain bearing (24, 25) via the lubricant outlet, and wherein a discharge area of the circulation system (30) is disposed in the area of the lubricant outlet. An operationally safe design can be implemented for such a compressor if provision is made for the cross-section area of the outlet of the liquid outlet of the plain bearing (24, 25) to be completely covered by the lubricant held in the discharge area.

20 Claims, 7 Drawing Sheets

(51) Int. Cl.
*F04D 29/057* (2006.01)
*F04D 29/063* (2006.01)
*F04D 29/58* (2006.01)
*F16C 33/66* (2006.01)

(52) U.S. Cl.
CPC ....... *F04D 29/063* (2013.01); *F04D 29/5806* (2013.01); *F16C 33/667* (2013.01); *F16C 33/6692* (2013.01); *F16C 2360/44* (2013.01)

(56) References Cited

U.S. PATENT DOCUMENTS

| | | | |
|---|---|---|---|
| 8,459,932 B2 * | 6/2013 | Nakano | F01D 25/16 |
| | | | 415/112 |
| 10,393,169 B2 * | 8/2019 | Kleinschmidt | F16C 17/10 |
| 10,670,071 B2 | 6/2020 | Berger | |
| 11,199,220 B2 | 12/2021 | Berger | |
| 2010/0111681 A1 * | 5/2010 | Nakano | F01D 25/16 |
| | | | 384/132 |
| 2021/0262483 A1 | 8/2021 | Henzler | |
| 2021/0310372 A1 | 10/2021 | Berger | |
| 2022/0065132 A1 | 3/2022 | Berger | |
| 2022/0120193 A1 | 4/2022 | Berger et al. | |

OTHER PUBLICATIONS

EPO Search Report for corresponding patent application No. 20156734.4, dated Aug. 17, 2020, 8 pages (not prior art).

* cited by examiner

COMPRESSOR

The invention relates to a compressor for generating a compressed air flow for a fuel cell, having a compressor element, in particular a compressor wheel, wherein the compressor element is coupled a to a drive shaft for co-rotation, the drive shaft being driven by a motor, in particular an electric motor, wherein at least one hydrodynamic or hydrostatic bearing is used to mount the shaft in a rotatable manner, wherein the plain bearing is connected to a lubricant supply means, which is used to supply a lubricant for hydrodynamic or hydrostatic pressure generation to the plain bearing, wherein the lubricant is water or a fluid mixture, predominantly comprising water, wherein the plain bearing has a lubricant inlet and a lubricant outlet, wherein the lubricant can be routed to the plain bearing via the lubricant inlet and the lubricant can be discharged from the plain bearing via the lubricant outlet, and wherein a discharge area of the circulation system is disposed in the area of the lubricant outlet.

Currently, a fuel cell powered by pure hydrogen is considered the drive of the future, as it emits only pure water vapor. Hydrogen and air are routed to a reaction chamber in the fuel cell. It has been shown that the power density and consequently the efficiency of the fuel cell can be increased if the air is supplied pressurized. A charging unit is required to provide the compressed air. Usually, an electric compressor or a turbo-compressor is used for this purpose. In electric compressors, an electric motor drives the compressor element. Compressor elements as defined in the context of the invention are in particular compressor wheels or screw-type compressors. Compressor wheels in terms of the invention, can in particular be those compressor wheels that draw in air along their axis of rotation and then radially discharge compressed air. Such compressor wheels are also commonly referred to as radial fans.

In the state of the art, different types of bearings are used to support the shaft on which the compressor element is mounted. Bearings having rolling elements or plain bearings are known. Plain bearings are superior in this respect because of the high speeds occurring. The hydrodynamic bearings used in this process require a lubricant that is routed in the hydrodynamic gap between the rotor and the stator of the plain bearing. Oil is usually used as a lubricant. If oil is used, there is a risk of oil entering the air circuit via leakages and being fed to the fuel cell. Oil contaminating the fuel cell membrane results in the latter's destruction.

Solutions, in which water is used as the lubricant, are therefore known from the prior art. For instance, EP 2 600 015 A1 describes a turbo compressor for a fuel cell system in which the drive shaft of the compressor is mounted on plain bearings lubricated with water.

Such a solution is disclosed in DE 10 2009 051 560 A1. This document also describes that an additive can be mixed into the water, for instance antifreeze. The term water as defined in the context of the invention is in particular, an aqueous solution, in which one or more additives, in particular antifreeze agents, are added to the water. In particular, provision may be made for the additive to have no damaging effect on the membrane of the fuel cell.

It has been shown that when water is used, especially with high-speed compressor elements, bearing failures occur.

The invention addresses the problem of providing a compressor of the type mentioned above, which results in a reliable mode of operation when water is used as a lubricant in the plain bearings.

This problem is solved according to the invention in that the entire cross-section area of the outlet of the liquid outlet of the plain bearing(s) is completely covered by the lubricant held in the discharge area.

The inventors have recognized that in certain operating situations in the technical solutions known from the prior art, foaming can occur in the lubricant downstream of the lubricant outlet from the plain bearings. The resulting air bubbles are entrained in the lubricant circuit and then returned to the plain bearing. Because of the insufficient lubricity of the air, the load-carrying capacity of the plain bearing then drops. As a result, damage to the bearing surfaces (bearing seizure) may occur. Knowing this problem, the inventors found to their surprise that foam can be significantly reduced or prevented from forming when the entire liquid cross-section area of the outlet of the plain bearing is completely covered with lubricant. In this way, any bearing damage is effectively prevented.

According to a particularly preferred alternative invention, provision can be made for the circulation system to be completely filled with lubricant and vented. This prevents air from collecting in areas of the lubricant supply, which air is then inadvertently entrained and transported to the plain bearings.

If provision is made for the circulation system to have a vent port for connecting a vent line, then the system can be easily filled and also maintained.

Particularly preferably, according to the invention, provision may be made for the lubricant supply to form a closed circulation system. The closed system guarantees a continuous supply of lubricant. In particular, unintentional substances are prevented from being introduced into the lubricant supply, which substances can cause damage to the membrane of the fuel cell.

Particularly preferably, provision may be made for the lubricant to be kept pressurized in such a way that the lubricant pressure at least in the area of the cross-section area of the liquid outlet of the plain bearing is greater than the ambient pressure, and that the lubricant pressure at least in the area of the cross-section area of the outlet is preferably at least 0.5 bar and further preferably at most 5 bar. It has been shown that, with the appropriate application of lubricant pressure, any foam formation downstream of the plain bearing can also be effectively suppressed. As a result of this measure, almost no more harmful bubble formation occurs. This further increases operational reliability. Preferably, a closed lubricant circulation system is used. This has already been mentioned above. When using such a closed lubricant circulation system, it is recommended to pressurize the entire circulation system, taking into account the above pressure specifications.

One conceivable variant of the invention is such that a degassing device is provided, to which the lubricant discharged from the lubricant outlet of the plain bearing is routed, and that in the degassing device the gas transported in the lubricant is at least partially separated from the lubricant. This measure further reduces the gas content in the lubricant. Typical discharge procedures can be used. For instance, in an area of the circulation system, negative pressure can be used to separate any gas entrained in the lubricant.

It has been shown that a bubble-free lubricant supply is supported by the at least one plain bearing being disposed in a bearing housing, and by a lubricant supply line of the lubricant supply supplying the lubricant to the plain bearing in the direction of gravity beneath the plain bearing.

In addition or alternatively, for this purpose provision is made for the at least one plain bearing to be disposed in a bearing housing, for the lubricant to be discharged via a lubricant discharge line, and for the lubricant discharge line to discharge the lubricant from the plain bearing in the direction of gravity above the plain bearing.

Within the scope of the invention, it is also conceivable that a lubricant pump is provided, which supplies the lubricant to the at least one plain bearing, and that the lubricant pump is preferably disposed at geodetic height beneath the plain bearing.

According to a preferred variant of the invention, provision may be made for a heat exchanger to be disposed upstream of the at least one plain bearing, through which heat exchanger the lubricant is passed in order to extract heat therefrom. In this way, the lubricant can also effectively cool the plain bearing at the same time.

If provision is made for the compressor element, the drive shaft and the motor, in particular the electric motor, to be disposed in a compressor housing, for the lubricant supply to form a closed circulation system with a lubricant pump, and for the circulation system to be installed in or at the compressor housing, then the compressor can be handled easily. For instance, in the simplest case, it can then be designed such that only the air duct, in which the compressor element is disposed, is coupled for a connection to the fuel cell system.

Within the scope of the invention, a turbo compressor, in which a turbine is installed on the shaft that also bears the compressor wheel, can also be used. The exhaust gas stream coming from the fuel cell can be routed to the turbine. In this way, the power consumption of the electric motor can be reduced. If such a design is used, provision may be made, for instance, for the turbine to be also mounted in the compressor housing. The turbine air duct can then also be connected to the fuel cell.

In a preferred further development of the invention, provision can be made for the motor, implemented as an electric motor, to be connected to power electronics for driving the compressor element, wherein the power electronics are preferably attached to or secured in the compressor housing, wherein a heat exchanger is assigned to the power electronics, which heat exchanger is in heat-exchanging contact with a heat-generating area of the power electronics, and for the lubricant to be routed as a coolant to the plain bearing(s) downstream of the heat exchanger. This further reduces the number of parts required for the compressor.

According to the invention, provision can also be made for a heat exchanger to be assigned to the motor, which is designed as an electric motor, for driving the compressor element, and that the lubricant routed to the plain bearing(s) or the lubricant discharged from the plain bearing(s) is supplied as a coolant through this heat exchanger. Thus, the electric motor is directly cooled by the lubricant.

The bearing for the shaft of the compressor element can be formed by a hydrodynamic bearing. Particularly preferably provision can be made for the plain bearing(s) to be designed as hydrodynamic bearing(s), wherein the hydrodynamic bearing(s) has/have a rotor and a stator, wherein the rotor can be rotated relative to the stator, wherein a rotor bearing surface faces a counter surface of the stator to generate hydrodynamic pressure in the area of a converging gap, for the rotor bearing surface and/or the counter surface in a section along and through the axis of rotation in sectional view to form a continuous bearing contour, which is preferably formed from at least two contour sections, which are particularly preferably formed as a straight line and a curvature or as curvatures, to generate hydrodynamic load-bearing capacities in the radial and axial directions, wherein preferably provision is made for the bearing contour, in a section along and through the axis of rotation in sectional view, to be able to be continuously differentiated along the axis of rotation. Such bearings are known as shown for example in U.S. Pat. No. 10,670,071.

Such a bearing arrangement can be used to achieve a particularly high load carrying capacity in the smallest installation space possible. In particular, axial and radial loads of varying magnitude occurring during operation can be reliably transferred.

Multi-surface plain bearings, which contribute to effectively preventing instabilities of the lubricant film and unbalance-induced vibrations, are also particularly effective in this respect. Accordingly, for this purpose, provision may also be made for the rotor bearing surface and the counter surface of the plain bearing(s) to form a multi-surface plain bearing.

In the arrangement according to the invention, a water-based lubricant is used to lubricate the plain bearings. Nevertheless, sealing the bearing against the gas flow path is essential for the use of the compressor to operate a fuel cell. If, for instance, the water contains antifreeze, such as glycol, this will not destroy the fuel cell membrane, but it will reduce its performance. For this reason provision may be made for the compressor element to be mounted in the area of an air duct, which has an air supply and, downstream of the compressor element, a pressure line, which can be used to discharge the compressed air generated by the compressor element, for the shaft to be routed out of a bearing housing, in which the plain bearing(s) is/are disposed and into the area of the air duct, and for the shaft passage from the bearing housing into the area of the air duct to be sealed by means of a combination consisting of a face seal and a gas-dynamic seal. This ensures effective sealing even in the event that the lubricant is transported in a lubricant circuit pressurized relative to the environment. A sealing concept, in which sealing air tapped at the compressor outlet is used to implement a sealing effect, is also conceivable.

Figure 2:
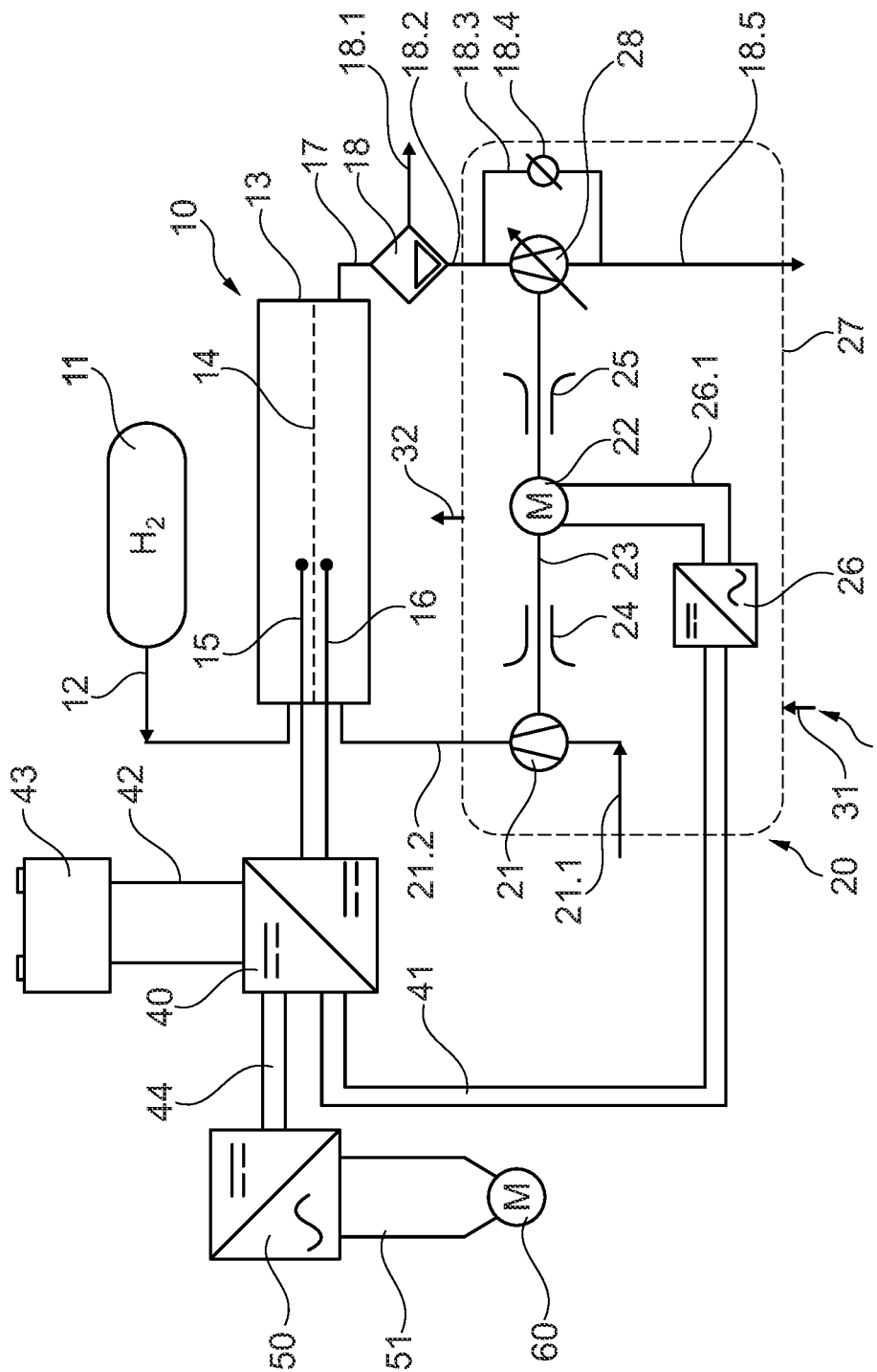

The invention is explained in greater detail below based on exemplary embodiments shown in the drawings. In the Figures:

FIGS. 1 and 2 each show a block diagram of a fuel cell system having a compressor, FIGS. 3 to 7, respectively, show block diagrams of a compressor for use in a fuel cell system according to FIG. 1.

FIG. 1 shows a schematic view of a fuel cell 10 having a reaction chamber 13. A membrane 14 is disposed in the reaction chamber 13, separating an anode chamber from a cathode chamber. An anode 15 is mounted in the anode compartment and a cathode 16 is mounted in the cathode compartment. A supply line 12 can be used to supply hydrogen to the anode compartment from a hydrogen tank 11.

A compressor 20 can be used to supply compressed air to the cathode chamber. A discharge line 17 is routed out of the reaction chamber 13. This discharge line 17 can be used to discharge the exhaust gas generated during the chemical reactions in the fuel cell 10 in the form of water vapor.

A water separator 18 may be integrated into the discharge line 17. The water separator 18 has a water drain 18.1. It can be used to discharge any separated water. Furthermore, the water separator 18 has a gas line 18.2. It can be used to discharge the gas phase separated in the water separator 18.

The anode 15 and the cathode 16 are connected to a voltage transformer 40. A cable 42 can be used to connect the battery 43 via the voltage converter 40. Accordingly, the fuel cell 10 can charge the battery 43 during operation. Further, a cable 44 can also be used to connect an inverter 50 to the voltage converter 40. In the inverter 50, the direct current generated by the fuel cell 10, or the direct current supplied from the battery 43, is converted to alternating current. A power cable 51 is used to feed this alternating current to an electric motor 60. For instance, the electric motor 60 may be the prime mover of a motor vehicle.

The compressor 20 has a compressor housing 27. A bearing housing (not shown) is disposed in the compressor housing 27. The bearing housing comprises two spaced-apart plain bearings 24, 25. These are preferably designed as hydrodynamic bearings 24, 25. The plain bearings 24, 25 are used to mount a drive shaft 23 in a rotatable manner in the bearing housing. A motor 22, namely an electric motor, is connected to the drive shaft 23.

The motor 22 drives the drive shaft 23. Furthermore, a compressor element 21 is connected to the drive shaft 23 for co-rotation. The compressor element 21 is a compressor wheel, preferably a radial fan. This radial fan takes in ambient air along its axis of rotation. In the compressor wheel, the intake air is compressed and blown off radially. A pressure line 21.2 is used to supply the compressed air to the cathode 16 of the fuel cell 10. An air supply 21.1 is used to supply the ambient air.

The motor 22 is powered by a power source. In this exemplary embodiment, the battery 43 is used as the power source. The electric motor 22 is connected to power electronics 26 that control the operation of the electric motor 22. The power electronics 26 are preferably located at or in the compressor housing 27. A power line 26.1 leads from the power electronics 26 to the voltage converter 40 (cable 41).

FIG. 2 shows an embodiment of the compressor that is largely identical to the embodiment of the compressor shown in FIG. 1. To avoid repetition, reference can be made to the explanations above. Only the differences are explained in more detail below.

As shown in FIG. 2, the gas line 18.2 is routed into the compressor housing 27, where it is routed to a turbine 28. In the turbine 28, the pressurized reaction gas coming from the fuel cell 10 can be expanded. The expanded gas is discharged via a gas duct 18.5 and led out of the compressor housing 27.

The turbine 28 is connected to the drive shaft 23 and is connected thereto for co-rotation. In this way, the mechanical drive power generated in the turbine 28 can be transmitted to the drive shaft 23. This unburdens the electric motor 22, thus reducing its power consumption.

A bypass line 18.3 can be assigned to the turbine 28. The bypass line 18.3 connects the gas line 18.2 to the gas duct 18.5, bypassing the turbine 28. A valve 18.4 is integrated in the bypass line 18.3. The valve 18.4 can be opened or closed depending on the existing pressure conditions. In this way, the turbine 28 is either bypassed or all or part of the reaction gas flows therethrough.

FIGS. 3 to 7 show variants of a compressor 20. In these illustrations, the turbine 28 (and the gas line 18.2, the gas duct 18.5, and the bypass 18.3) are optional, i.e. two alternative designs of the compressor 20 are feasible, namely one having a turbine 28 and one without a turbine 28.

The embodiments according to FIGS. 3 to 7 refer in principle to the embodiments of the compressor 20 according to FIGS. 1 and 2. To avoid repetition, reference is made to the explanations above. Only the changes shown in these drawings are explained.

Figure 3:
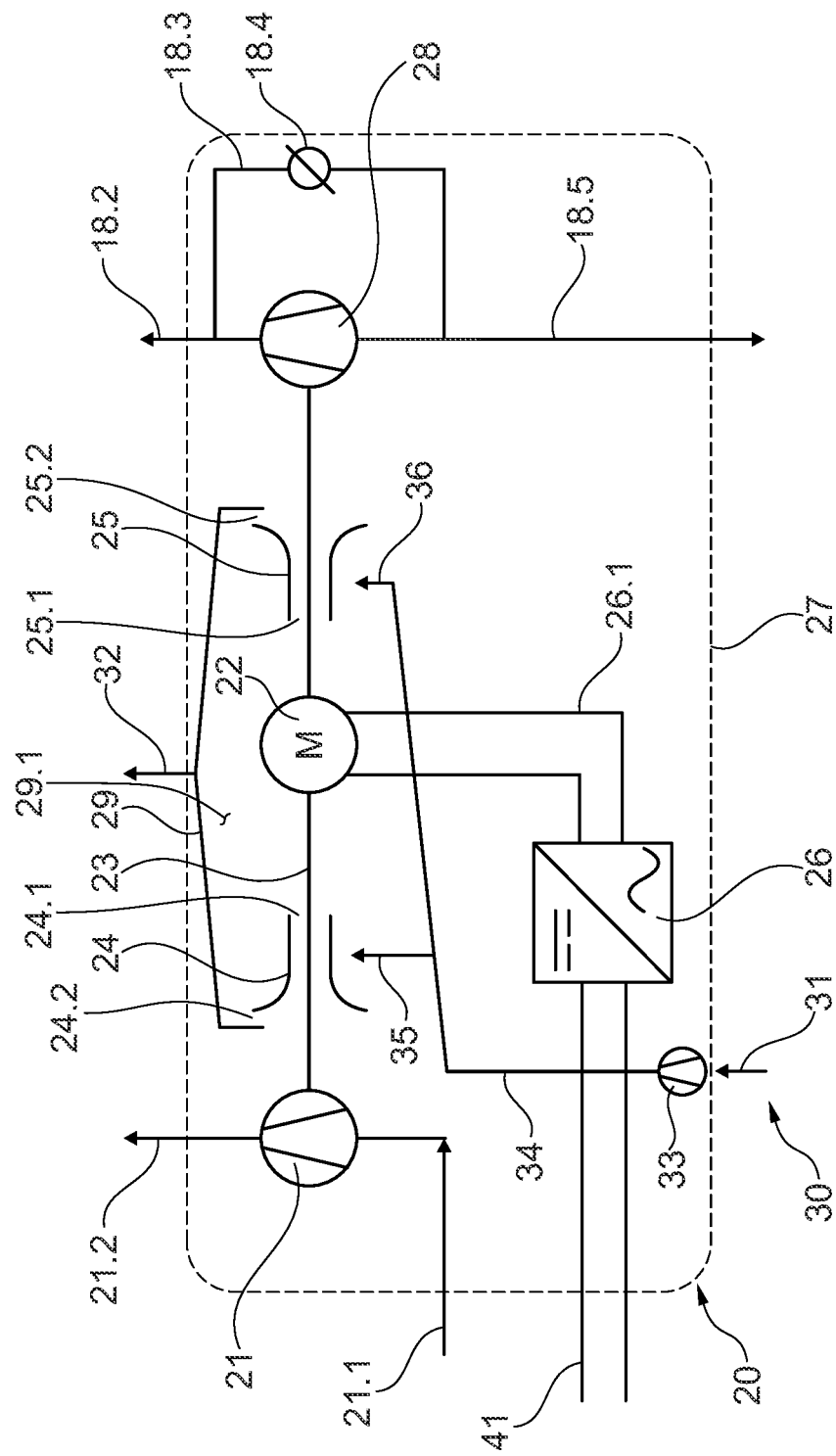

FIG. 3 shows a lubricant supply 30 that is assigned to the two plain bearings 24, 25. The lubricant supply 30 can be used to supply the required lubricant to the two plain bearings 24, 25.

In the context of the invention, water or a water mixture is used as the lubricant, wherein additives, for instance antifreeze, can be added to a water, and the use of other additives is also conceivable.

The lubricant supply 30 has a lubricant supply line 31 routed into the compressor housing 27. The lubricant supply line 31 is connected to a lubricant pump 33 in the compressor housing 27. The lubricant pump 33 pumps the lubricant into a pump line 34. Branch lines 35, 36 extend from the pump line 34, each of which branch lines is routed to a plain bearing 24, 25.

As can be seen in FIG. 3, the lubricant pump 33 is disposed at geodetic height beneath the two plain bearings 24, 25 when the compressor 20 is installed as intended.

During operation of the compressor 20, the drive shaft 23 rotates and the compressor element 21 therewith. The lubricant is routed to the plain bearings 24, 25 in the area of their lubricant inlets 24.1 and 25.1, respectively. As a result of the rotation of the drive shaft 23, the lubricant is pumped through a converging gap of the hydrodynamic bearings 24, 25. The lubricant exits the hydrodynamic bearings 24, 25 in the area of their lubricant outlets 24.2 and 25.2, respectively. This lubricant outlet opens into a collection area 29.1, in which lubricant is held. The lubricant covers the entire cross-section area of the lubricant outlets 24.2 and 25.2 in the collection area 29.1. This reduces or suppresses foam from forming in the lubricant. In addition, the collection area may be pressurized relative to the environment. This further adds to the suppression of foam formation.

Downstream of the collecting areas of the two plain bearings 24, 25, the lubricant flows into a collector 29. A lubricant discharge line 32 is connected to the collector 29. The lubricant discharge line 32 is routed out of the compressor housing 27.

As can be seen from FIG. 3, in the intended installation state of the compressor, the lubricant discharge line 32 is preferably disposed at geodetic height, above the two plain bearings 24,25. In other words, the lubricant is discharged in the direction of gravity above the plain bearings 24, 25. This results in an additional beneficial effect on degassing the lubricant. In the event that residual gaseous substances are still present in the lubricant, these can be at least partially separated here.

Figure 4:
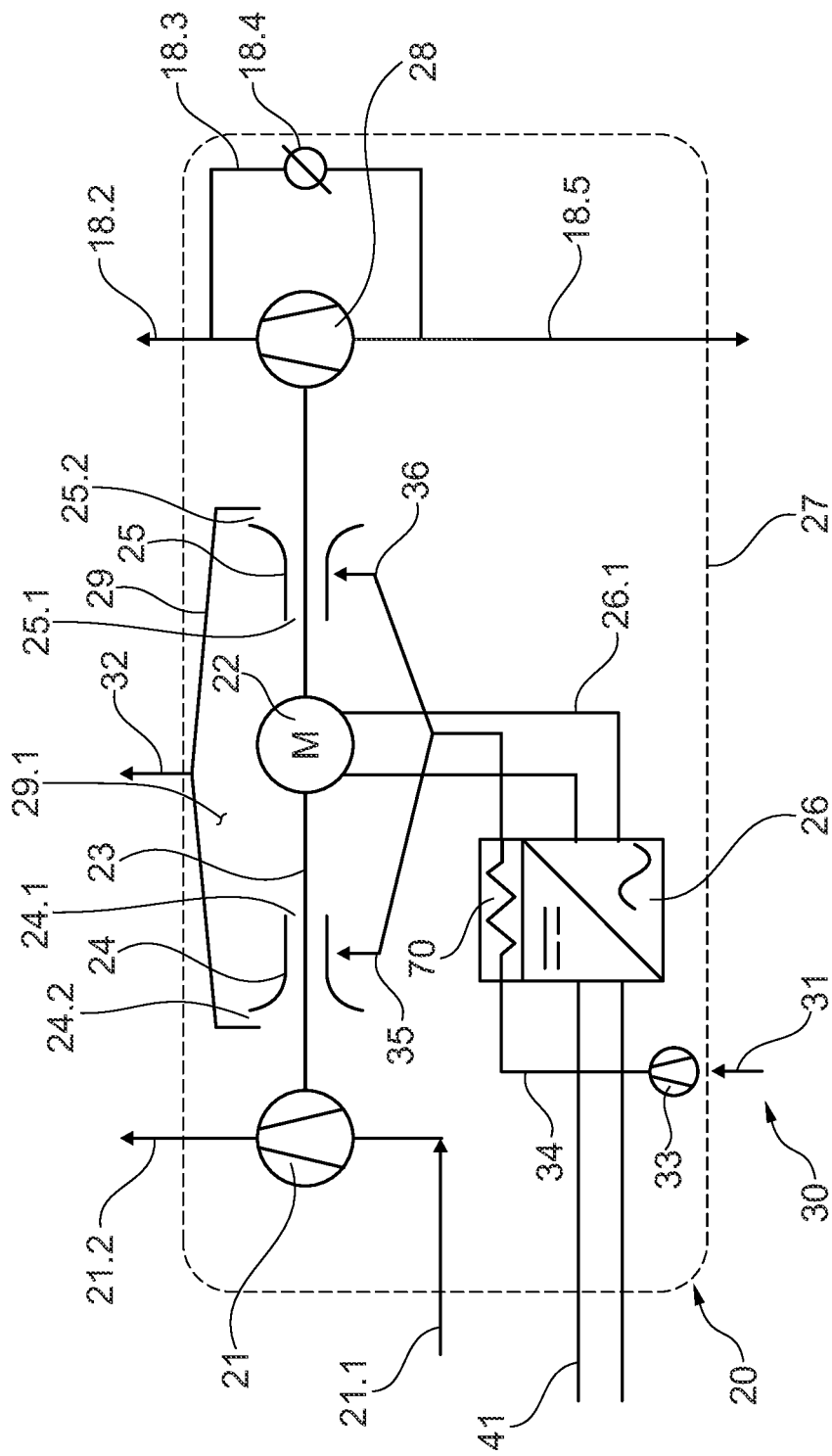

FIG. 4 shows a further development of the invention according to FIG. 3. As this embodiment shows, a heat exchanger 70 is assigned to the power electronics 26 that actuate the motor 22. This heat exchanger 70 may be mounted directly on the power electronics 26, wherein, for instance, rib-shaped heat exchanger fins are provided in the heat exchanger and connected to heat-generating surfaces of the power electronics 26. The heat exchanger fins are then surrounded by the flowing lubricant, i.e., a heat exchange into the lubricant can occur there.

It is also conceivable that, for instance, there is a cooling plate in the heat exchanger 70, which cooling plate is connected to the power electronics, for instance by means of a paste having high thermal conductivity. The lubricant can be routed to the heat exchanger through the cooling plate.

The heat exchanger 70 may be integrated into the lubricant supply 30. For instance, as FIG. 4 shows, the pump line 34 can be connected to the heat exchanger and extend therethrough to transfer the dissipated heat from the power electronics 26 into the lubricant.

Downstream of the heat exchanger 70, the pump line 34 is again connected to the two hydrodynamic bearings 24, 25, as in FIG. 3.

Figure 5:
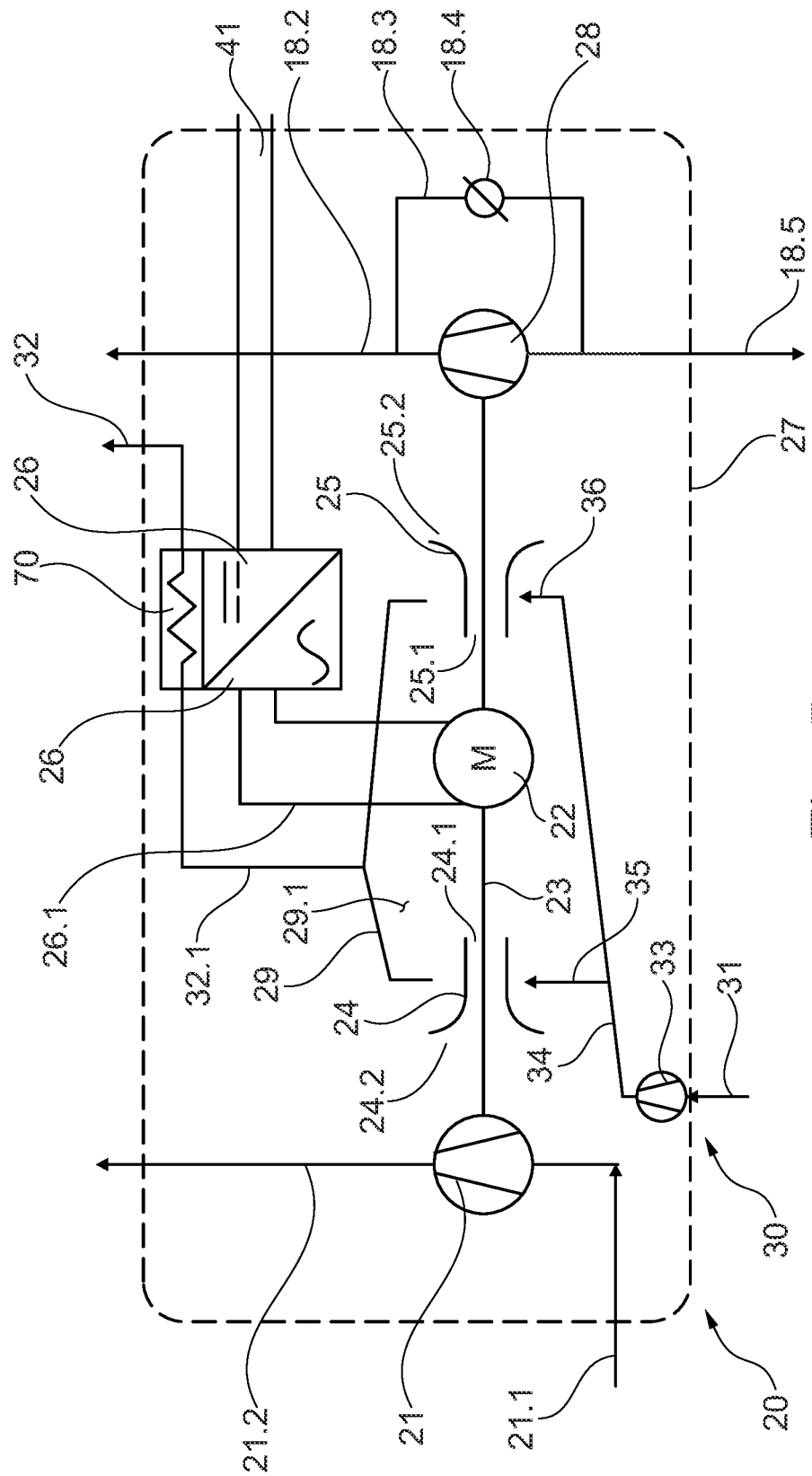

FIG. 5 shows a further development of the design according to FIG. 4. Here, as in FIG. 4, a heat exchanger 70 is assigned to the power electronics 26. However, the heat exchanger is now integrated into the lubricant discharge line 32 and connected to the collector 29 via a line section 32.1.

As in FIG. 4, the heat exchanger 70 and the power electronics 26 are preferably also disposed in the compressor housing 27 in FIG. 5. However, it is also conceivable that one or both of these units are located outside the compressor housing 27.

In FIG. 4, the heat of the power electronics 26 heats the lubricant before entering the plain bearings 24, 25.

In FIG. 5, the lubricant coming from the plain bearings 24, 25 is routed to the heat exchanger 70. The advantage of the heat exchanger 70 being located downstream of the plain bearings 24, 25 is that the plain bearings 24, 25 can be lubricated using a liquid of similar temperature under all operating conditions.

Figure 6:
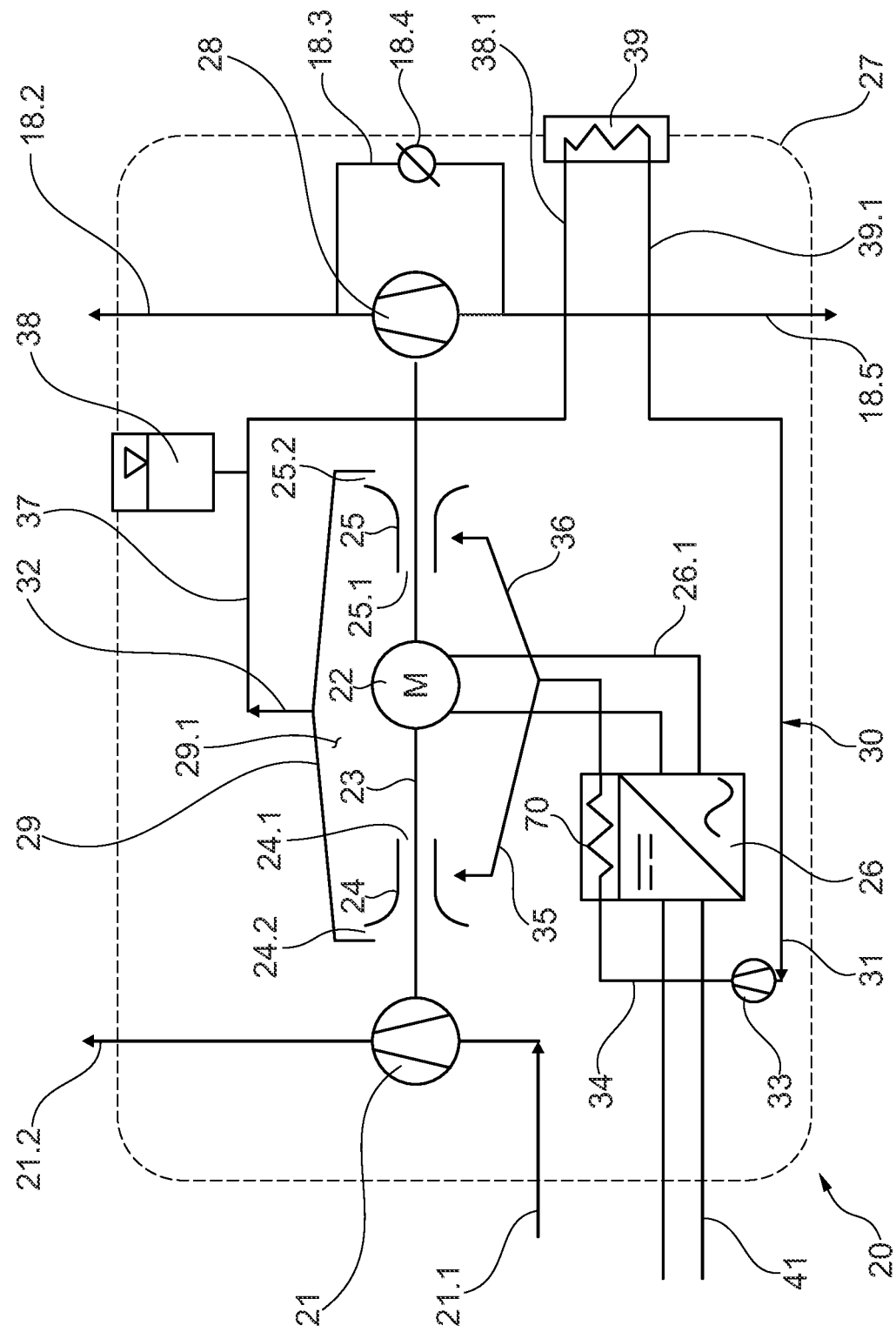

FIG. 6 shows an embodiment of the compressor 20 similar to FIG. 4. As this embodiment shows, a closed circulation system is preferably provided for the lubricant supply 30. This circulation system 30 is completely filled with the lubricant and vented.

Accordingly, a line 38.1 can be connected downstream of the lubricant discharge line. It can be routed to a heat exchanger 39, for instance. However, the heat exchanger 39 may be integrated at any other point in the circulation system.

A line 39.1 returns from the heat exchanger 39 to the lubricant pump 33. The heat exchanger 39 is used to transfer heat from the lubricant to the environment. In this way, the temperature level of the lubricant can be lowered.

Preferably, as FIG. 6 shows, the complete circulation system is located inside the compressor housing 27. In this way, a closed system is formed that does not require any connection to the environment, making for easy installation and operation.

FIG. 6 further shows that an expansion tank 38 of conventional design is integrated into the circulation system. The expansion tank 38 can be used to compensate for any temperature-related thermal expansion of the lubricant.

If a closed lubricant circuit is provided, as shown in FIG. 6, which closed lubricant circuit is disposed in or on the compressor housing 27, only the pressure line 21.2 has to be coupled to the fuel cell 10 for connection to the fuel cell 10. The air supply 21.2 then only has to be additionally routed across the area boundary of compressor 20 (dashed illustration of compressor housing 27).

If the compressor variant using a turbine 28 is implemented, the gas line 18.2 and the gas duct 18.5 also have to be routed across the area boundary.

Figure 7:
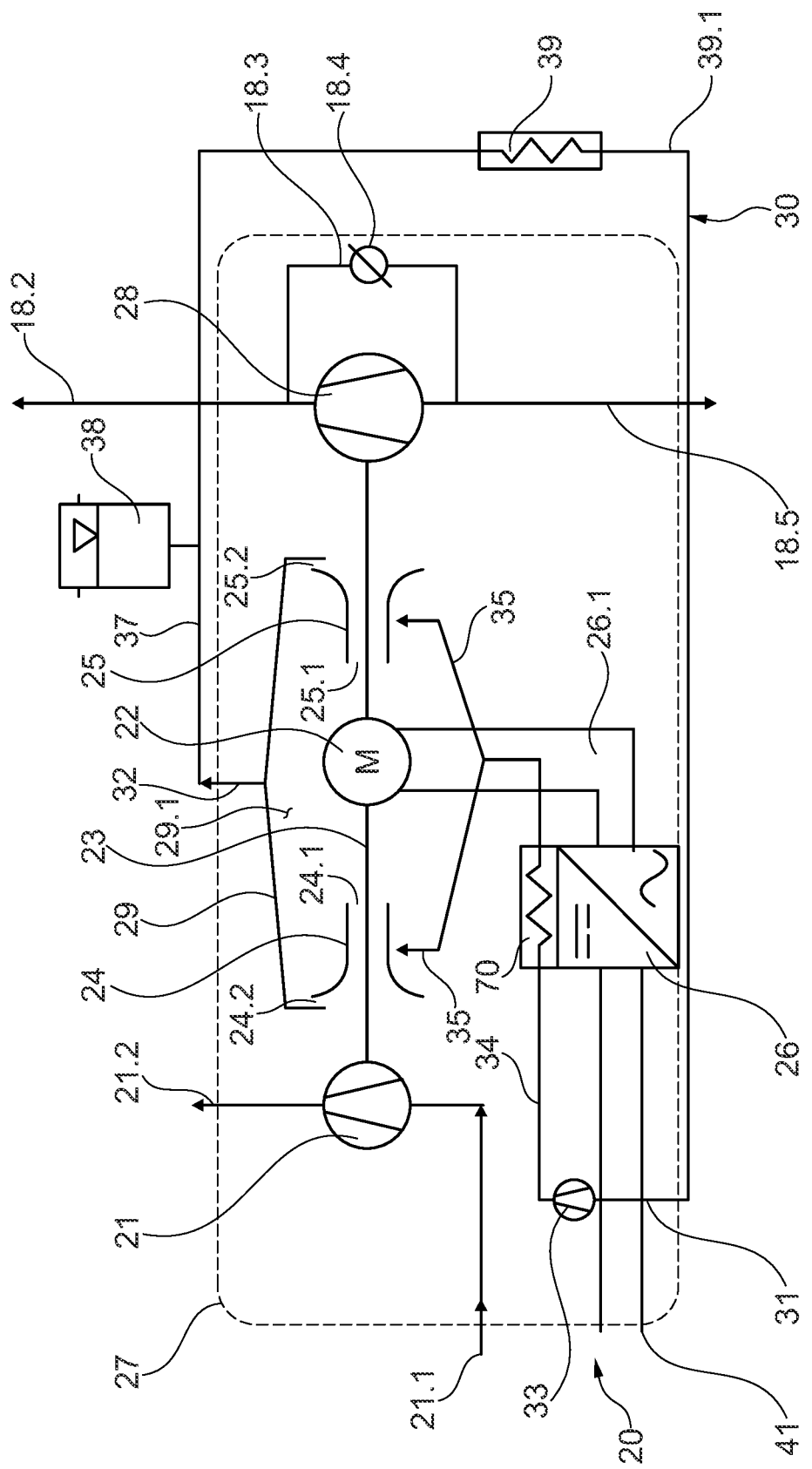

However, as FIG. 7 shows, the circulation system 30 does not have to be completely contained within the compressor housing 27 or present at the compressor housing 27. It is also conceivable that only a part of the circulation system 30 is routed in or at the compressor housing 27.

In particular, it is conceivable that the circulation system 30 is connected to an external heat exchanger 39. This heat exchanger 39 can also be part of a cooling system of a motor vehicle, for instance.

The invention claimed is:

1. A compressor for generating a compressed air flow for a fuel cell, comprising:
   a drive shaft;
   a compressor wheel mounted on the drive shaft for co-rotation with the drive shaft;
   an electric motor configured to drive the drive shaft;
   at least one plain bearing rotatably supporting the drive shaft, the plain bearing including a lubricant inlet for receiving a lubricant for hydrodynamic or hydrostatic pressure generation and a lubricant outlet for discharging the lubricant;
   a lubricant supply connected to the plain bearing to supply the lubricant to the lubricant inlet of the plain bearing, the lubricant being water or a fluid mixture predominantly comprising water; and
   a discharge area arranged to hold the lubricant discharged from the lubricant outlet of the plain bearing such that an entire cross-section area of the lubricant outlet is completely covered by the lubricant held in the discharge area.

2. The compressor of claim 1, wherein:
   the lubricant supply is completely filled with the lubricant and the lubricant supply is vented.

3. The compressor of claim 1, wherein:
   the lubricant supply comprises a closed circulation system.

4. The compressor of claim 1, wherein:
   the lubricant supply is configured such that a lubricant pressure at the lubricant outlet of the plain bearing is greater than an ambient pressure surrounding the compressor.

5. The compressor of claim 1, wherein:
   the lubricant supply is configured such that a lubricant pressure at the lubricant outlet of the plain bearing is at least 0.5 bar.

6. The compressor of claim 5, wherein:
   the lubricant supply is configured such that the lubricant pressure at the lubricant outlet of the plain bearing is at most 5 bar.

7. The compressor of claim 1, further comprising:
   a lubricant discharge line located at a geodetic height above the plain bearing such that any gas transported in the lubricant is at least partially separated from the lubricant.

8. The compressor of claim 1, wherein:
   the lubricant supply includes a lubricant supply line configured to supply the lubricant to the plain bearing from beneath the plain bearing relative to a direction of gravity.

9. The compressor of claim 1, wherein:
   the lubricant supply includes a lubricant discharge line configured to discharge the lubricant from the plain bearing above the plain bearing relative to a direction of gravity.

10. The compressor of claim 1, wherein:
    the lubricant supply includes a lubricant pump configured to supply the lubricant to the plain bearing, the lubricant pump being disposed at a geodetic height beneath the plain bearing relative to a direction of gravity.

11. The compressor of claim 1, further comprising:
    a heat exchanger fluidically connected to the plain bearing and configured to extract heat from the lubricant.

12. The compressor of claim 1, further comprising:
    a compressor housing, the compressor wheel, the drive shaft and the electric motor being disposed in the compressor housing; and wherein the lubricant supply is a closed circulation system located within or on the compressor housing, the closed circulation system including a lubricant pump.

13. The compressor of claim 12, further comprising:
a power electronics connected to the electric motor, the power electronics being attached to or secured in the compressor housing;
a heat exchanger in heat-exchanging contact with a heat-generating area of the power electronics; and
wherein the lubricant supply is configured such that the lubricant is routed as coolant to the plain bearing downstream of the heat exchanger.

14. The compressor of claim 1, wherein:
the plain bearing includes a rotor and a stator, the rotor being rotated relative to the stator, the rotor including a rotor bearing surface facing a counter surface of the stator for hydrodynamic pressure generation in an area of a converging gap, wherein the rotor bearing surface and/or the counter surface in a section along and through an axis of rotation in sectional view form a continuous bearing contour formed from at least two contour sections to generate hydrodynamic load-bearing capacities in both radial and axial directions.

15. The compressor of claim 14, wherein:
the rotor bearing surface and the counter surface form a multi-surface plain bearing.

16. A compressor for generating a compressed air flow for a fuel cell, comprising:
a drive shaft;
a compressor wheel mounted on the drive shaft for co-rotation with the drive shaft;
an electric motor configured to drive the drive shaft;
at least one plain bearing rotatably supporting the drive shaft; and
a closed circulation system configured to supply a lubricant to the plain bearing, the lubricant being water or a fluid mixture predominantly comprising water, the closed circulation system including:
a pump;
lubricant supply line arranged to supply the lubricant from the pump to the plain bearing from beneath the plain bearing;
a collector arranged to collect lubricant discharged from a lubricant outlet of the plain bearing, the collector being arranged such that the lubricant outlet is completely covered by the lubricant.

17. The compressor of claim 16, further comprising:
a compressor housing, the compressor wheel, the drive shaft and the electric motor being disposed in the compressor housing; and
wherein the closed circulation system is located within or on the compressor housing.

18. The compressor of claim 16, wherein:
the closed circulation system is completely filled with the lubricant.

19. The compressor of claim 16, wherein:
the pump is configured to pressurize the closed circulation system such that a pressure of the lubricant at the lubricant outlet of the plain bearing is at least 0.5 bar and at most 5 bar.

20. The compressor of claim 16, wherein:
the arrangement of the collector such that the lubricant outlet is completely covered by the lubricant reduces formation of foam in the lubricant.

* * * * *